United States Patent
Anzawa

(10) Patent No.: US 8,825,344 B2
(45) Date of Patent: Sep. 2, 2014

(54) CONTROL APPARATUS AND CONTROL METHOD FOR INTERNAL COMBUSTION ENGINE

(75) Inventor: Takumi Anzawa, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 273 days.

(21) Appl. No.: 13/378,828

(22) PCT Filed: Jun. 7, 2010

(86) PCT No.: PCT/IB2010/001369
§ 371 (c)(1),
(2), (4) Date: Dec. 16, 2011

(87) PCT Pub. No.: WO2010/150066
PCT Pub. Date: Dec. 29, 2010

(65) Prior Publication Data
US 2012/0090585 A1 Apr. 19, 2012

(30) Foreign Application Priority Data
Jun. 23, 2009 (JP) ................................ 2009-148588

(51) Int. Cl.
F02D 41/00 (2006.01)
F02M 25/07 (2006.01)
F02P 5/15 (2006.01)

(52) U.S. Cl.
CPC ........... F02D 41/0065 (2013.01); F02M 25/07 (2013.01); F02P 5/1516 (2013.01)
USPC ....................................................... 701/108

(58) Field of Classification Search
CPC ...... F02P 5/14; F02P 5/1516; F02D 41/0065; F02M 25/07

USPC ........... 123/406.48, 406.55, 568.11; 701/108
See application file for complete search history.

(56) References Cited

U.S. PATENT DOCUMENTS

| 5,303,168 A | 4/1994 | Cullen et al. |
| 2003/0226544 A1 | 12/2003 | Nakamori et al. |
| 2009/0017987 A1 | 1/2009 | Satou et al. |

FOREIGN PATENT DOCUMENTS

| EP | 1439298 A2 | 7/2004 |
| JP | 01-083839 A | 3/1989 |
| JP | 08-074716 A | 3/1996 |
| JP | 09-209895 A | 8/1997 |
| JP | 11201010 A | 7/1999 |
| JP | 2003-200760 A | 7/2003 |
| JP | 2006-046084 A | 2/2006 |
| JP | 2007-182836 A | 7/2007 |

*Primary Examiner* — Hai Huynh

(74) *Attorney, Agent, or Firm* — Gifford, Krass, Sprinkle, Anderson & Citkowski, P.C.

(57) ABSTRACT

When EGR is on (YES in S100), an ECU selects a first map for the time when EGR is on as an intake air temperature correction map (S 102). Thus, an intake air temperature correction retardation amount α is set to an intake air temperature correction retardation amount αon (THa, KL) for the time when EGR is on, which corresponds to an intake air temperature THa and an engine load KL. On the other hand, when EGR is off (NO in S100), the ECU selects a second map for the time when EGR is off as an intake air temperature correction map (S 104). Thus, the intake air temperature correction retardation amount α is set to an intake air temperature correction retardation amount αoff (THa, KL) for the time when EGR is off, which corresponds to the intake air temperature THa and the engine load KL.

12 Claims, 13 Drawing Sheets

FIG. 9

FIRST MAP (FOR TIME WHEN EGR IS ON)

| | THa(1), THa(2) · · · , THa(m) |
|---|---|
| KL(1) | αon(11), αoff(21) · · · , αon(m1) |
| KL(2) | αon(12) |
| ⋮ | ⋮ ⋮ |
| KL(n) | αon(1n) · · · · · · · · , αon(mn) |

FIG. 10

SECOND MAP (FOR TIME WHEN EGR IS OFF)

| | THa(1), THa(2) · · · , THa(m) |
|---|---|
| KL(1) | αoff(11), αoff(21) · · , αoff(m1) |
| KL(2) | αoff(12) |
| ⋮ | ⋮ ⋮ |
| KL(n) | αoff(1n) · · · · · · · · , αoff(mn) |

CONTROL APPARATUS AND CONTROL METHOD FOR INTERNAL COMBUSTION ENGINE

BACKGROUND OF THE INVENTION

1. Field of the Invention

The invention relates to the control of an internal combustion engine, and more particularly, to the control of an ignition timing of an internal combustion engine equipped with a device for recirculating into an intake pipe part of exhaust gas flowing through an exhaust pipe.

2. Description of the Related Art

In recent years, for the purpose of improving fuel consumption and reducing the amount of noxious substances in exhaust gas, there is known an internal combustion engine equipped with an exhaust gas recirculation device (an EGR device) that recirculates part of exhaust gas to an intake pipe. An art for controlling the ignition timing of an internal combustion engine equipped with such an EGR device is disclosed in Japanese Patent Application Publication No. 2006-46084 (JP-A-2006-46084).

In the control apparatus disclosed in Japanese Patent Application Publication No. 2006-46084 (JP-A-2006-46084), a base ignition timing is calculated on the basis of an operation state (a rotational speed, a load, and the like) of the internal combustion engine equipped with the EGR device in controlling the ignition timing of the internal combustion engine, and an actual ignition timing is controlled in accordance with a result obtained by correcting this base ignition timing with a correction amount regarding an intake air temperature, a correction amount regarding an EGR amount, and the like.

The correction amount regarding the EGR amount is a value for correcting the base ignition timing toward an advancement side. In consideration of the fact that the speed of combustion decreases as the amount of EGR gas increases, the correction amount regarding the EGR amount, namely, the amount of advancement is increased as the amount of EGR increases.

On the other hand, the correction amount regarding the intake air temperature is a value for correcting the base ignition timing toward a retardation side. In consideration of the fact that the speed of combustion increases as the intake air temperature rises, the correction amount regarding the intake air temperature, namely, the amount of retardation is increased as the intake air temperature rises.

As described above, in the art disclosed in Japanese Patent Application Publication No. 2006-46084 (JP-A-2006-46084), the correction amount regarding the EGR amount (the amount of advancement) is increased as the amount of EGR gas increases. The base ignition timing is thereby advanced as the EGR amount increases.

However, it is not disclosed at all how the presence or absence of EGR gas and the amount of EGR gas are taken into account in calculating the correction amount regarding the intake air temperature (the amount of retardation). That is, in Japanese Patent Application Publication No. 2006-46084 (JP-A-2006-46084), it is disclosed that the correction amount regarding the intake air temperature (the amount of retardation) is increased as the intake air temperature rises, but it is not disclosed at all how to set the correction amount regarding the intake air temperature (the amount of retardation) in accordance with the presence or absence of EGR gas and the amount of EGR gas.

SUMMARY OF THE INVENTION

The invention provides a control apparatus and a control method that can enhance a torque and a fuel consumption rate in an internal combustion engine equipped with a recirculation device for returning part of exhaust gas to an intake side.

A first aspect of the invention relates to a control apparatus for an internal combustion engine equipped with a recirculation device for returning part of exhaust gas to an intake side. This control apparatus includes a calculation portion and a control portion. The calculation portion calculates a retardation amount indicating an amount by which a base ignition timing determined by an operation state of the internal combustion engine is corrected toward a retardation side, in accordance with at least one of an intake air temperature as a temperature of a gas sucked into the internal combustion engine, a coolant temperature as a temperature of a coolant for cooling the internal combustion engine, and an oil temperature as a temperature of an oil in the internal combustion engine. The control portion controls an ignition timing of the internal combustion engine with reference to a set ignition timing obtained by retarding the base ignition timing in accordance with the retardation amount. In this control apparatus, the calculation portion calculates the retardation amount as a larger value when the recirculation device is in operation than when the recirculation device is stopped.

In the control apparatus according to this aspect of the invention, the retardation amount may be an intake air temperature retardation amount indicating an amount by which the base ignition timing is corrected toward the retardation side in accordance with the intake air temperature as the temperature of the gas sucked into the internal combustion engine.

In the control apparatus according to this aspect of the invention, the intake air temperature retardation amount during operation of the recirculation device, which is calculated by the calculation portion, may assume or take a value that increases as an amount of exhaust gas returned to the intake side by the recirculation device increases.

The control apparatus according to this aspect of the invention may further include a storage portion that stores therein in advance a first map that determines the intake air temperature retardation amount during operation of the recirculation device using an intake air temperature of the internal combustion engine as a parameter, and a second map that determines the intake air temperature retardation amount during stoppage of the recirculation device using an intake air temperature of the internal combustion engine as a parameter. The calculation portion may calculate the intake air temperature retardation amount as a value corresponding to an actual intake air temperature of the internal combustion engine using the first map when the recirculation device is in operation, and may calculate the intake air temperature retardation amount as a value corresponding to an actual intake air temperature of the internal combustion engine using the second map when the recirculation device is stopped.

In the control apparatus according to this aspect of the invention, the first map may be a map that determines the intake air temperature retardation amount using as a parameter a load of the internal combustion engine as well as the intake air temperature of the internal combustion engine. The calculation portion may calculate the intake air temperature retardation amount as a value corresponding to an actual intake air temperature of the internal combustion engine and an actual load of the internal combustion engine using the first map when the recirculation device is in operation.

In the control apparatus according to this aspect of the invention, the recirculation device may return to the intake side exhaust gas in an exhaust gas recirculation amount that is adjusted in accordance with a load of the internal combustion engine. The first map may be set such that a second intake air temperature retardation amount corresponding to a second load at which the exhaust gas recirculation amount is equal to a second amount larger than a first amount becomes larger than a first intake air temperature retardation amount corresponding to a first load at which the exhaust gas recirculation amount is equal to the first amount.

In the control apparatus according to this aspect of the invention, the first map may be a map that determines the intake air temperature retardation amount using as a parameter a rotational speed of the internal combustion engine as well as the intake air temperature of the internal combustion engine and the load of the internal combustion engine. The calculation portion may calculate the intake air temperature retardation amount as a value corresponding to an actual intake air temperature of the internal combustion engine, an actual load of the internal combustion engine, and an actual rotational speed of the internal combustion engine using the first map when the recirculation device is in operation.

In the control apparatus according to this aspect of the invention, the retardation amount may be a coolant temperature retardation amount indicating an amount by which the base ignition timing is corrected toward the retardation side in accordance with the coolant temperature as the temperature of the coolant for cooling the internal combustion engine.

The control apparatus according to this aspect of the invention may further include a storage portion that stores therein in advance a first map that determines the coolant temperature retardation amount during operation of the recirculation device using the coolant temperature of the internal combustion engine, a load of the internal combustion engine, and a rotational speed of the internal combustion engine as parameters, and a second map that determines the coolant temperature retardation amount during stoppage of the recirculation device using the coolant temperature of the internal combustion engine, the load of the internal combustion engine, and the rotational speed of the internal combustion engine as parameters. The calculation portion may calculate the coolant temperature retardation amount as a value corresponding to an actual coolant temperature of the internal combustion engine, an actual load of the internal combustion engine, and an actual rotational speed of the internal combustion engine using the first map when the recirculation device is in operation, and calculates the coolant temperature retardation amount as a value corresponding to an actual coolant temperature of the internal combustion engine, an actual load of the internal combustion engine, and an actual rotational speed of the internal combustion engine using the second map when the recirculation device is stopped.

In the control apparatus according to this aspect of the invention, the retardation amount may be an oil temperature retardation amount indicating an amount by which the base ignition timing is corrected toward the retardation side in accordance with the oil temperature as the temperature of the oil in the internal combustion engine.

The control apparatus according to this aspect of the invention may further include a storage portion that stores therein in advance a first map that determines the oil temperature retardation amount during operation of the recirculation device using the oil temperature of the internal combustion engine, a load of the internal combustion engine, and a rotational speed of the internal combustion engine as parameters, and a second map that determines the oil temperature retardation amount during stoppage of the recirculation device using the oil temperature of the internal combustion engine, the load of the internal combustion engine, and the rotational speed of the internal combustion engine as parameters. The calculation portion may calculate the oil temperature retardation amount as a value corresponding to an actual oil temperature of the internal combustion engine, an actual load of the internal combustion engine, and an actual rotational speed of the internal combustion engine using the first map when the recirculation device is in operation, and may calculate the oil temperature retardation amount as a value corresponding to an actual oil temperature of the internal combustion engine, an actual load of the internal combustion engine, and an actual rotational speed of the internal combustion engine using the second map when the recirculation device is stopped.

In the control apparatus according to this aspect of the invention, the control portion may repeatedly perform control for setting a target ignition timing obtained through correction of the set ignition timing in accordance with a predetermined amount to set an actual ignition timing of the internal combustion engine as the target ignition timing, and control for correcting the predetermined amount in accordance with a situation of occurrence of knocking in the internal combustion engine.

A control method according to another aspect of the invention relates to a control method for an internal combustion engine equipped with a recirculation device for returning part of exhaust gas to an intake side. This control method includes calculating a retardation amount indicating an amount by which a base ignition timing determined by an operation state of the internal combustion engine is corrected toward a retardation side, in accordance with at least one of an intake air temperature as a temperature of a gas sucked into the internal combustion engine, a coolant temperature as a temperature of a coolant for cooling the internal combustion engine, and an oil temperature as a temperature of an oil in the internal combustion engine, and controlling an ignition timing of the internal combustion engine with reference to a set ignition timing obtained by retarding the base ignition timing in accordance with the retardation amount. In this control method, the retardation amount is calculated as a larger value when the recirculation device is in operation than when the recirculation device is stopped.

In the control method according to this aspect of the invention, the retardation amount may be an intake air temperature retardation amount indicating an amount by which the base ignition timing is corrected toward the retardation side in accordance with the intake air temperature as the temperature of the gas sucked into the internal combustion engine.

In the internal combustion engine equipped with the recirculation device for returning part of exhaust gas to the intake side, the invention makes it possible to enhance the torque and fuel consumption rate of the internal combustion engine.

BRIEF DESCRIPTION OF THE DRAWINGS

The foregoing and further objects, features and advantages of the invention will become apparent from the following description of example embodiments of the invention with reference to the accompanying drawings, wherein like numerals are used to represent like elements and wherein:

FIG. 9 is a view showing an intake air temperature correction map that is used when EGR is on;

FIG. 10 is a view showing an intake air temperature correction map that is used when EGR is off;

DETAILED DESCRIPTION OF EMBODIMENTS

The embodiments of the invention will be described hereinafter with reference to the drawings. In the following description, like components are denoted by like reference symbols. The components denoted by the same reference symbol are identical in name and function. Accordingly, the detailed description of those components will not be repeated.

Figure 1:
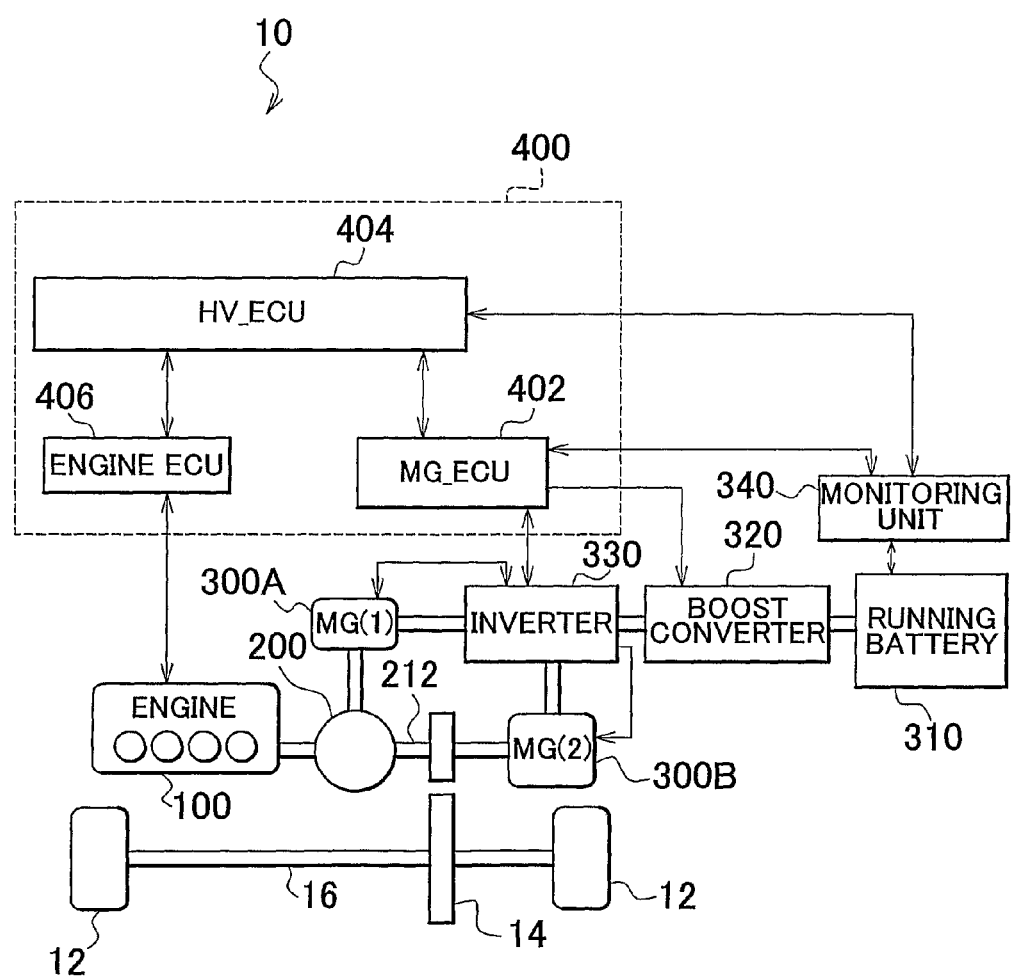
FIG. 1 is a view showing the structure of a vehicle mounted with an ECU.

The first embodiment of the invention will be described hereinafter. FIG. 1 is a view showing the structure of a vehicle 10 mounted with a control apparatus according to this embodiment of the invention. The vehicle 10 is a vehicle (hereinafter referred to also as "a hybrid vehicle") that runs by at least one of a motive power of an engine 100 and a motive power of a second motor-generator (MG(2)) 300B. It should be noted that vehicles to which the control apparatus according to the invention is applicable are not necessarily hybrid vehicles.

In addition to the aforementioned engine 100 and the aforementioned MG(2) 300B, the vehicle 10 includes a motive power split mechanism 200, a speed reducer 14, a running battery 310, an inverter 330, a boost converter 320, an engine ECU 406, an MG_ECU 402, an HV_ECU 404, and the like. The motive power split mechanism 200 distributes a motive power generated by the engine 100 to an output shaft 212 and a first motor-generator (MG(1)) 300A. The speed reducer 14 transmits motive powers generated by the engine 100, the MG(1) 300A, and the MG(2) 300B to driving wheels 12, and transmits the driving of the driving wheels 12 to the engine 100, the MG(1) 300A, and the MG(2) 300B. The running battery 310 accumulates an electric power for driving the MG(1) 300A and the MG(2) 300B. The inverter 330 performs current control while converting a direct current of the running battery 310 and alternating currents of the MG(1) 300A and the MG(2) 300B. The boost converter 320 carries out voltage conversion between the running battery 310 and the inverter 330. The engine ECU 406 controls the operational state of the engine 100. The MG_ECU 402 controls the charge/discharge states and the like of the MG(1) 300A, the MG(2) 300B, the inverter 330, and the running battery 310 in accordance with the state of the vehicle 10. The HV_ECU 404 mutually manages and controls the engine ECU 406, the MG_ECU 402, and the like, and controls an entire hybrid system such that the vehicle 10 can run most efficiently.

The motive power split mechanism 200 is constructed as a planetary gear including a sun gear, a pinion gear, a carrier, and a ring gear. The engine 100, the MG(1) 300A, and the MG(2) 300B are coupled to one another via the motive power split mechanism 200. Thus, there is established a relationship among respective rotational speeds of the engine 100, the MG(1) 300A, and the MG(2) 300B such that determination of any two of the rotational speeds leads to determination of the other rotational speed.

In FIG. 1, the respective ECU's are constructed separately from one another. However, two or more of the ECU's may be integrated to constitute an ECU. For example, as indicated by dotted lines in FIG. 1, the MG_ECU 402, the HV_ECU 404, and the engine ECU 406 are integrated with one another to constitute an ECU 400. In the following description, the MG_ECU 402, the HV_ECU 404, and the engine ECU 406 will be described as the ECU 400 without being distinguished from one another.

Signals of a vehicle speed sensor (not shown), an accelerator opening degree sensor (not shown), a throttle opening degree sensor (not shown), an MG(1) rotational speed sensor (not shown), an MG(2) rotational speed sensor (not shown), a monitoring unit 340 that monitors the state of the running battery 310, and the like are input to the ECU 400.

The engine 100 and peripheral components associated with the engine 100 will be described with reference to FIG. 2. In this engine 100, air sucked in from an air cleaner (not shown) flows through an intake pipe 110 and is introduced into a combustion chamber 102 of the engine 100. The amount of the air introduced into the combustion chamber 102 is adjusted in accordance with the operation amount of a throttle valve 114 (a throttle opening degree). The throttle opening degree is controlled by a throttle motor 112 that operates on the basis of a signal from the ECU 400.

Fuel is injected from an injector 101 into the combustion chamber 102. Using an ignition coil 150 controlled through a control signal from the ECU 400, a mixture of the air introduced from the intake pipe 110 and the fuel injected from the injector 101 is ignited to be burned.

A top portion of the combustion chamber 102 is provided with an intake valve 103 and an exhaust valve 104. The amount of the air introduced into the combustion chamber 102 and the timing for introducing the air into the combustion chamber 102 are controlled by the intake valve 103. The amount of the exhaust gas discharged from the combustion chamber 102 and the timing for discharging the exhaust gas from the combustion chamber 102 are controlled by the exhaust valve 104. The intake valve 103 is driven by a cam 105. The exhaust valve 104 is driven by a cam 106.

The opening timing (valve-opening phase) of the intake valve 103 and the closing timing (valve-closing phase) of the intake valve 103 are changed by a variable valve timing (VVT) mechanism 126. It should be noted that the opening timing of the exhaust valve 104 and the closing timing of the exhaust valve 104 may be changed instead. In this embodiment of the invention, the opening timing of the intake valve 103 is controlled through rotation of a cam shaft (not shown) provided with the cam 105 by the VVT mechanism 126. It should be noted that this is not the only method of controlling the opening timing of the intake valve 103.

The exhaust gas after the combustion of the mixture in the combustion chamber 102 is discharged into the atmosphere through a catalyst 140 across which the exhaust pipe 120 extends.

Figure 2:
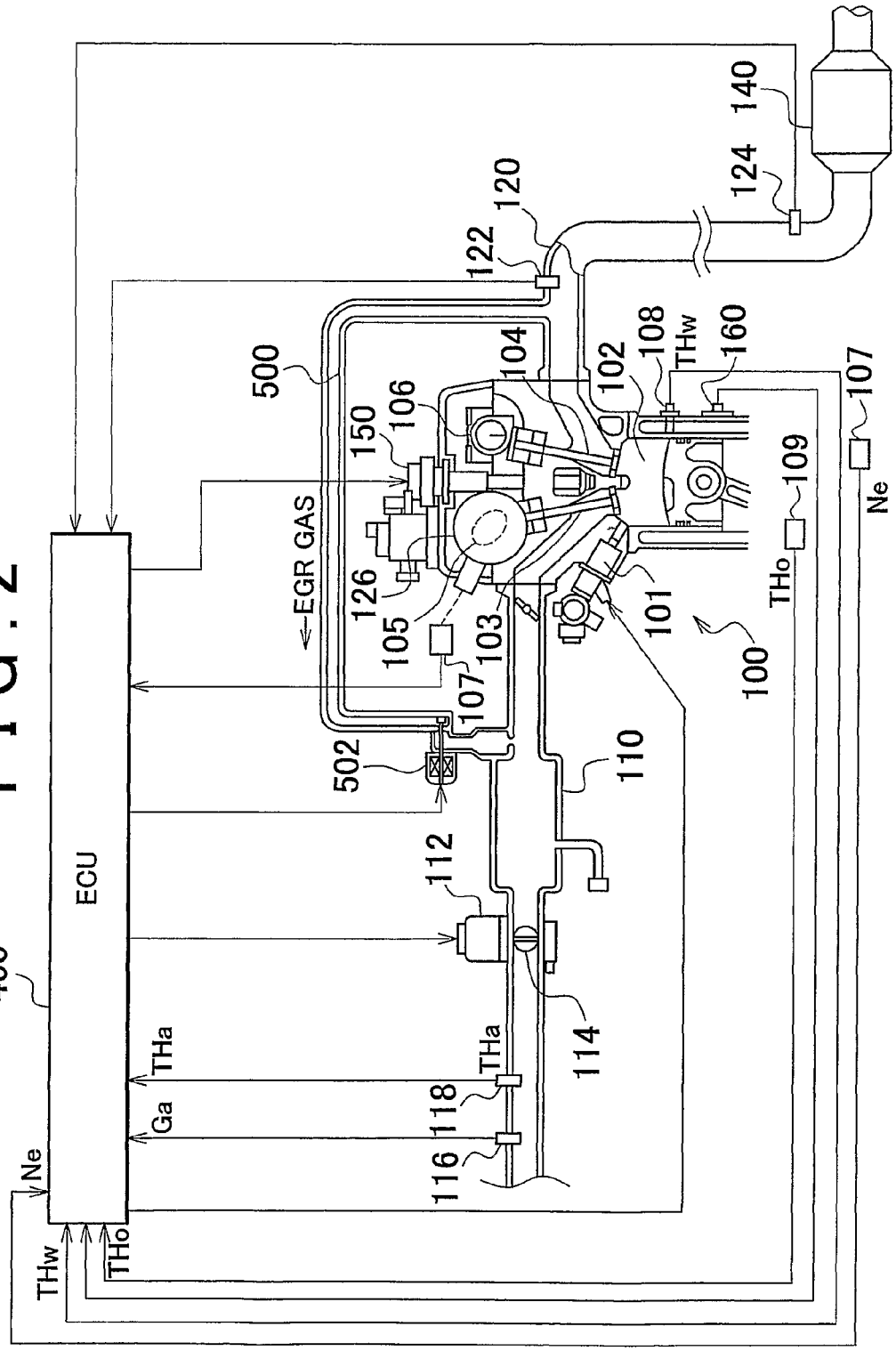
FIG. 2 is a schematic configurational view of an engine system controlled by the ECU.

As shown in FIG. 2, an exhaust gas recirculation system (hereinafter referred to also as "an EGR system") that recirculates to the intake pipe 110 through an EGR pipe 500 part of exhaust gas flowing through the exhaust pipe 120 is introduced in this engine 100. The introduction of this EGR system makes it possible to reduce the amount of noxious substances in exhaust gas and improve fuel consumption. The flow rate of the exhaust gas returned from the exhaust pipe 120 to the intake pipe 110 (hereinafter referred to as "EGR gas") is adjusted by an opening degree θ of an EGR valve 502. The EGR valve 502 is controlled through a control signal from the ECU 400.

Signals from an engine coolant temperature sensor 108, an airflow meter 116, an intake air temperature sensor 118, an air-fuel ratio sensor 122, and an oxygen sensor 124 are input to the ECU 400. The engine coolant temperature sensor 108 detects a temperature THw of an engine coolant (hereinafter also referred to simply as "a coolant temperature"). The airflow meter 116 detects an intake air amount Ga (an amount of air sucked into the engine 100 per unit time). The intake air temperature sensor 118 detects a temperature THa of intake air (hereinafter also referred to simply as "an intake air temperature"). The air-fuel ratio sensor 122 detects a ratio between the amounts of air and fuel in exhaust gas. The oxygen sensor 124 detects a concentration of oxygen in exhaust gas. These respective sensors transmit signals indicative of detection results to the ECU 400.

Furthermore, signals from an engine rotational speed sensor 107, an oil temperature sensor 109, and a knocking sensor 160 are input to the ECU 400.

The engine rotational speed sensor 107 detects a rotational speed Ne of a crankshaft of the engine 100 (an engine rotational speed). The oil temperature sensor 109 detects a temperature THo of an engine oil (an oil temperature). The knocking sensor 160 detects a voltage corresponding to an oscillation strength of a cylinder block of the engine 100 as information for detecting the occurrence of knocking in the engine 100. These respective sensors transmit signals indicative of detection results to the ECU 400.

On the basis of the signals sent from the respective sensors and maps and programs stored in a read only memory (a ROM), the ECU 400 performs throttle control, ignition timing control, fuel injection amount control, the control of the opening timing of the intake valve 103 (VVT control), the control of the opening degree θ of the EGR valve 502 (EGR control), and the like such that the engine 100 assumes a desired operational state.

The ECU 400 determines an advancement amount of the opening timing of the intake valve 103 (hereinafter referred to as "a VVT advancement amount") on the basis of an engine load KL and the engine rotational speed Ne, and controls the VVT mechanism 126 in accordance with the determined VVT advancement amount.

The ignition timing control according to this embodiment of the invention will be described with reference to FIGS. 3 and 4. It should be noted that the ignition timing will be expressed in the following description as a crank angle (° BTDC) before a top dead center. The top dead center is used as a criterion of this crank angle.

Figure 3:
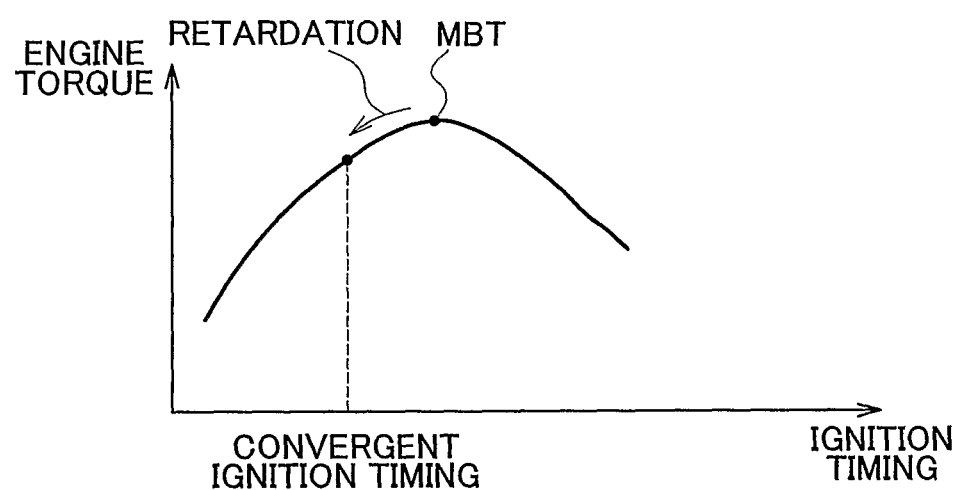
FIG. 3 is a view showing a relationship between an ignition timing of an engine and a torque of the engine.

FIG. 3 shows a relationship between ignition timing and engine torque at the time when the engine load assumes a predetermined value. As shown in FIG. 3, the relationship between ignition timing and engine torque is generally expressed by an upward convex curve when the engine load is constant. An ignition timing at which the engine torque assumes its maximum value is referred to as a minimum advance for best torque (an MBT). The MBT is also an ignition timing at which the best fuel consumption rate is obtained. Accordingly, it is desirable to set the ignition timing to the MBT in order to obtain the best fuel consumption rate. In this case, however, knocking may occur when the engine 100 assumes a certain operational state.

Thus, the ECU 400 performs knocking control to converge the ignition timing to a value closest to the MBT within such a range as to avoid the occurrence of knocking. A convergent value of the ignition timing obtained through this knocking control is a critical point corresponding to the beginning of knocking, and is sometimes referred to also as a trace knocking point, a knocking limit point, a convergent knocking point, or the like. In this embodiment of the invention, however, the convergent value of the ignition timing obtained through knocking control is referred to as "a convergent ignition timing". The convergent ignition timing is an ignition timing at which the largest torque and the best fuel consumption rate are obtained within such a range as to avoid the occurrence of knocking. Further, the ECU 400 has the function of learning the result of knocking control to converge the ignition timing to the convergent ignition timing at an early stage.

Figure 4:
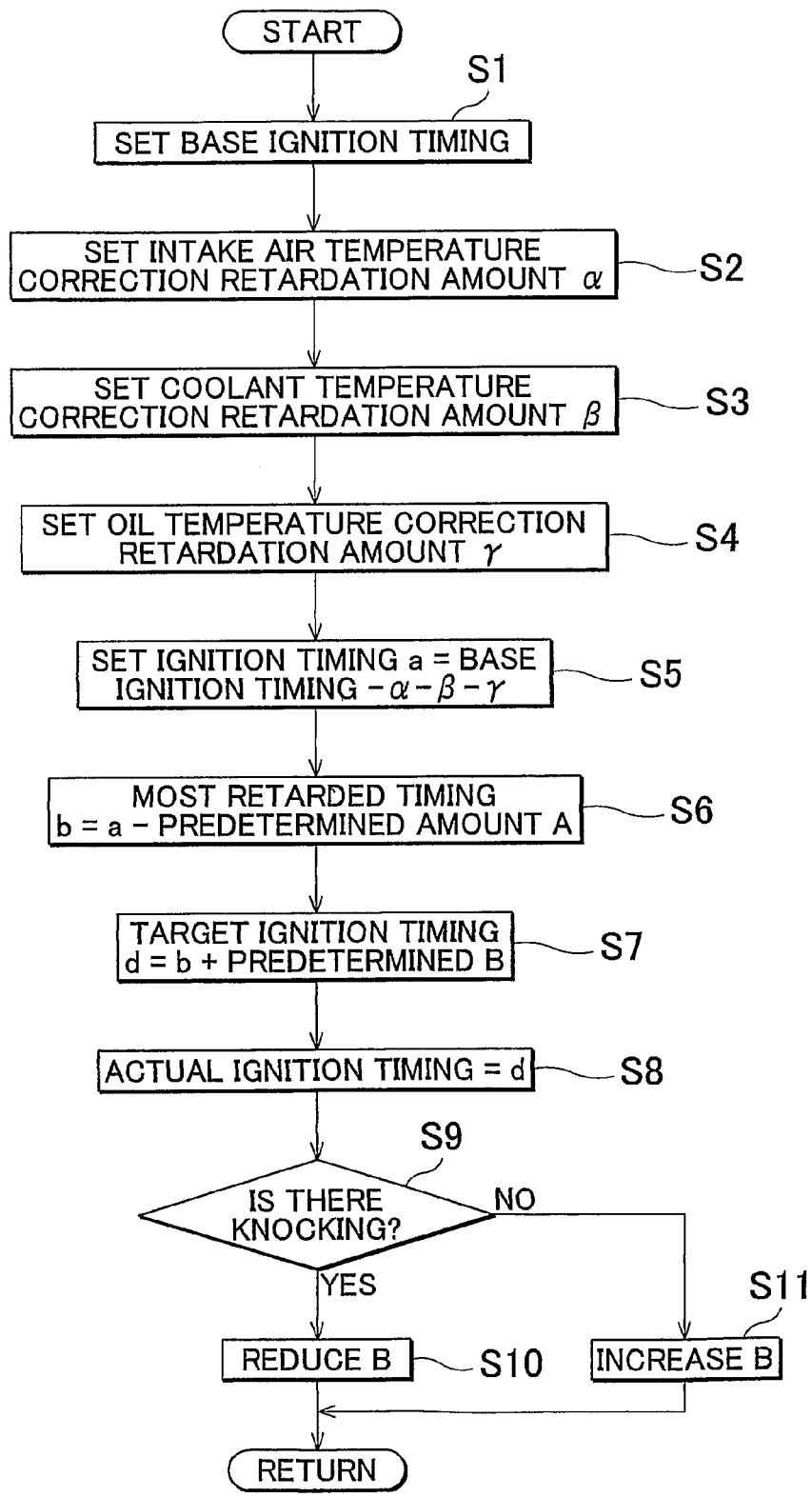
FIG. 4 is a view showing the flow of a processing of the ECU according to the first embodiment of the invention.

FIG. 4 shows the flow of a processing of the ECU 400 in the case where the ECU 400 performs knocking control. This processing is repeatedly performed at intervals of a predetermined cycle time. It should be noted that the flow of the processing shown in FIG. 4 is an example and is not limitative.

As shown in FIG. 4, the ECU 400 sets a base ignition timing (S1). It should be noted herein that the base ignition timing is a value corresponding to the MBT (e.g., a value obtained by slightly advancing the MBT). A base ignition timing map determining in advance a corresponding relationship between a physical quantity indicating the operational state of the engine 100 (the engine rotational speed Ne, the engine load KL, the EGR valve opening degree θ, the VVT advancement amount, and the like, which are closely related to the MBT) and the base ignition timing.

The base ignition timing map is created such that the base ignition timing is advanced as the EGR valve opening degree θ increases (as the amount of EGR gas increases), considering in advance the fact that the speed of combustion decreases and the convergent ignition timing changes toward the advancement side as the amount of EGR gas increases. It should be noted that the base ignition timing map is created on the assumption that the intake air temperature THa, the coolant temperature THw, and the oil temperature THo are equal to their respective reference temperatures (e.g., 25° C. as a room temperature).

Referring to this base ignition timing map, the ECU 400 sets a base ignition timing corresponding to an actual operational state of the engine 100.

Using an intake air temperature correction map, the ECU 400 sets an intake air temperature correction retardation amount α as a correction amount of the base ignition timing resulting from a change in the intake air temperature THa (S2). The intake air temperature correction retardation amount α is a value equivalent to an amount of change in the convergent ignition timing for an amount of change in the intake air temperature THa (a difference between the current intake air temperature THa and the aforementioned reference temperature). It should be noted that this intake air temperature correction map will be described later.

By the same token, using a coolant temperature correction map, the ECU 400 sets a coolant temperature correction retardation amount β as a correction amount of the base ignition timing resulting from a change in the coolant temperature THw (S3). The coolant temperature correction retardation amount β is a value equivalent to an amount of change in the convergent ignition timing for an amount of change in the coolant temperature THw (a difference between the current coolant temperature THw and the aforementioned reference temperature). This coolant temperature correction map is a two-dimensional map using the coolant temperature THw and the engine rotational speed Ne as parameters.

In addition, using an oil temperature correction map, the ECU 400 sets an oil temperature correction retardation amount γ as a correction amount of the base ignition timing resulting from a change in the oil temperature THo (S4). The oil temperature correction retardation amount γ is a value equivalent to an amount of change in the convergent ignition timing for an amount of change in the oil temperature THo (a difference between the current oil temperature THo and the aforementioned reference temperature). It should be noted that the setting of the oil temperature correction retardation amount γ may be omitted in consideration of the fact that the oil temperature THo has a smaller fluctuation width than the coolant temperature THw.

The ECU 400 then sets, as a set ignition timing a, a value obtained by subtracting the respective correction retardation amounts α, β, and γ from the base ignition timing (S5).

In addition, the ECU 400 sets, as a most retarded timing b, a value obtained by retarding the set ignition timing a by a predetermined amount A (S6). This predetermined amount A is a fixed value set to, for example, 15 crank angle (° CA).

The ECU 400 sets, as a target ignition timing d, a value obtained by advancing the most retarded timing b by a predetermined amount B (S7). This predetermined amount B is a fluctuant value stored in a storage portion of the ECU 400 with a learning result of knocking control reflected thereon.

For example; when the coolant temperature correction retardation amount β=the oil temperature correction retardation amount γ=0, the most retarded timing b=the set ignition timing a—the predetermined amount A and the set ignition timing a=the base ignition timing—the intake air temperature correction retardation amount α. It therefore turns out that the target ignition timing d=b+B=the base ignition timing −α−A+B. It should be noted, however, that the set ignition timing a is an upper-limit value (a most advanced value) of the target ignition timing d, and that the most retarded timing b is a lower-limit value (a most retarded value) of the target ignition timing d.

It should be noted that this is not the only method of calculating the target ignition timing d. For example, it is also appropriate to set as a reference ignition timing c a value obtained by advancing the most retarded timing b by a predetermined amount B, and to set as the target ignition timing d a value obtained by retarding the reference ignition timing c by a predetermined amount C (e.g., 3° CA).

When the target ignition timing d is set, the ECU 400 transmits to the ignition coil 150 a control signal for setting an actual ignition timing as the target ignition timing d (S8).

The ECU 400 then determines, on the basis of a detection signal of the knocking sensor 160, whether or not there is knocking (S9). For example, when the oscillation strength of the cylinder block of the engine 100 is higher than a criterial value or when the oscillation strength of the cylinder block of the engine 100 becomes higher than the criterial value with a frequency higher than a predetermined frequency, the ECU 400 determines that there is knocking. When there is knocking, the ECU 400 corrects the predetermined amount B in a decreasing manner, and updates an already stored value of the predetermined amount B to a post-correction value (S10). Thus, the target ignition timing d is retarded in the subsequent cycle. On the other hand, when there is no knocking, the ECU 400 corrects the predetermined amount B in an increasing manner, and updates the already stored value of the predetermined amount B to a post-correction value (S11). Thus, the target ignition timing d is advanced in the subsequent cycle.

In this manner, the ECU 400 repeatedly increases and reduces the predetermined amount B in accordance with the situation of occurrence of knocking (learns the predetermined amount B) to gradually converge the target ignition timing d (i.e., an actual ignition timing) to the convergent ignition timing. Accordingly, in order to converge the ignition timing to the convergent ignition timing at an earlier stage, it is important to minimize the fluctuation width of the predetermined amount B resulting from a change in the operational state of the engine 100.

Figure 5:
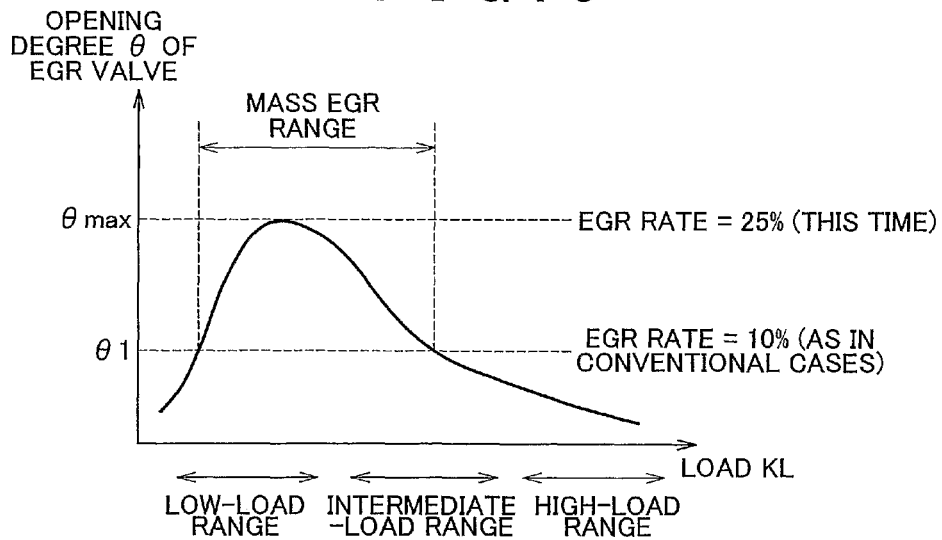
FIG. 5 is a view showing a corresponding relationship between an engine load and an EGR valve opening degree.

Referring to FIG. 5, the EGR control according to this embodiment of the invention will be described making a comparison with the EGR control according to the related art.

In the EGR control according to the related art, EGR gas is recirculated only when the engine rotational speed Ne is included in a specific range, and the recirculation of EGR gas is shut off when the engine rotational speed Ne is not included in the specific range. Further, even when EGR gas is recirculated, the EGR rate (the ratio of the amount of EGR gas to the amount of the entire mixture sucked into the combustion chamber 102) is at most equal to 10% or higher than 10% by several %, and the amount of EGR gas is small.

On the other hand, in the EGR control according to this embodiment of the invention, "all-range EGR control" is performed to recirculate EGR gas in all the ranges in which the engine rotational speed Ne fluctuates, and "mass EGR control" is performed to recirculate a larger amount of EGR gas than before.

"The all-range EGR control" will be described in detail. When an EGR activating condition that the vehicle speed be higher than a threshold speed (e.g., 3 km/h) and the coolant temperature THw be lower than a threshold temperature (e.g., 70° C.) is fulfilled, the ECU 400 opens the EGR valve 502 to recirculate EGR gas. When the EGR activating condition is not fulfilled, the ECU 400 closes the EGR valve 502 to shut off the recirculation of EGR gas. In the case where there are a mode attaching importance to fuel consumption and a mode attaching importance to power as running modes, a condition that the running mode be the mode attaching importance to fuel consumption may be added to the aforementioned EGR activating condition. At any rate, in this embodiment of the invention, the engine rotational speed Ne is not included in the EGR activating condition. Accordingly, when the EGR activating condition is fulfilled, EGR gas is recirculated regardless of the value of the engine rotational speed Ne.

Referring to FIG. 5, "the mass EGR control" will be described in detail. FIG. 5 is a view showing a corresponding relationship between the engine load KL and the EGR valve opening degree θ in this embodiment of the invention. It should be noted that the EGR rate increases as the EGR valve opening degree θ increases.

When the aforementioned EGR activating condition is fulfilled, the ECU 400 controls the EGR valve opening degree θ using the engine load KL as a parameter. It should be noted that the ECU 400 calculates the engine load KL on the basis of the intake air amount Ga, the engine rotational speed Ne, and the like.

In the EGR control according to the related art, the maximum value of the EGR valve opening degree θ is about θ1 shown in FIG. 5. This maximum value is about 10% when converted into the EGR rate.

On the other hand, in this embodiment of the invention, as shown in FIG. 5, when the engine load KL is included in a low-load range or an intermediate-load range, the EGR valve opening degree θ is controlled to a value much higher than a maximum value θ1 according to the related art, and the maximum EGR rate (the EGR rate at the time when the EGR valve opening degree θ is equal to a maximum value θmax) reaches about 25%, which is much higher than 10%.

A substantial improvement in fuel consumption is made through this mass EGR control. However, when mass EGR control is performed in combination with knocking control, new problems such as the frequent occurrence of knocking and a deterioration in fuel consumption arise in a transient period in which the engine load KL changes.

In the course of an analysis of factors for these problems, it has been newly revealed that the amount of reduction in the convergent ignition timing upon a rise in intake air temperature by a unit temperature (hereinafter referred to as "a knocking sensitivity for an intake air temperature" or simply as "the knocking sensitivity") greatly changes in accordance with the presence or absence of EGR gas and the EGR rate (the amount of EGR gas).

Figure 6:
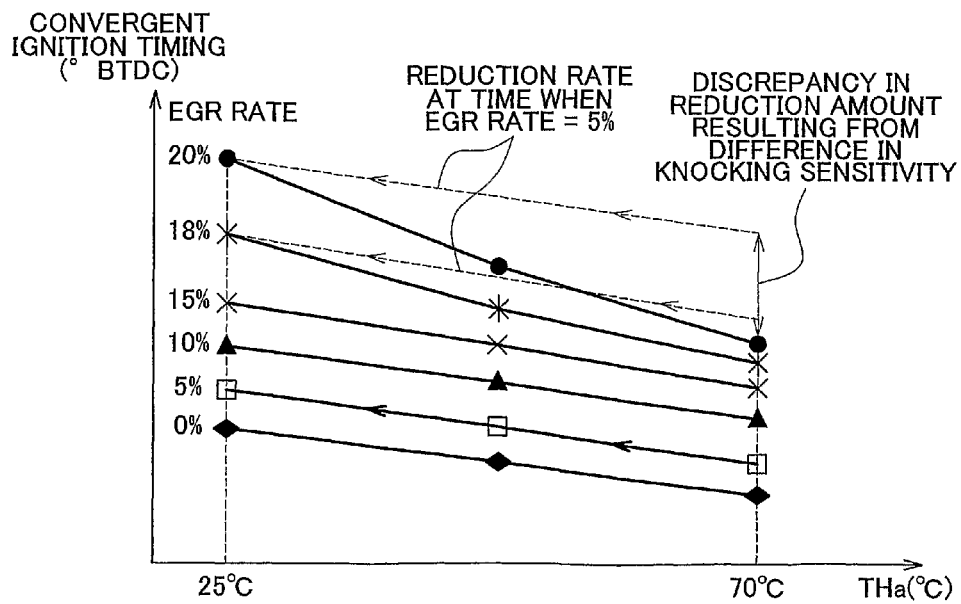
FIG. 6 is a view showing a corresponding relationship among an intake air temperature, an EGR rate, and a convergent ignition timing.

FIG. 6 shows a corresponding relationship among an intake air temperature THa, an EGR rate, and a convergent ignition timing. This corresponding relationship is obtained through the aforementioned analysis. FIG. 6 is a view showing how the convergent ignition timing changes as the intake air temperature THa changes, using the EGR rate as a parameter. In FIG. 6, "the knocking sensitivity for the intake air temperature" is equivalent to the gradient of each graph. It should be noted that the invention is not limited to the values shown in FIG. 6.

In the related art, it has been considered that the knocking sensitivity for the intake air temperature is substantially constant regardless of the presence or absence of EGR gas or the EGR rate. In FIG. 6 as well, the gradients of respective graphs with the EGR rate=0%, 5%, and 10% as included in the fluctuation range of the EGR rate according to the related art are slightly different from one another but substantially coincide with one another. Thus, the intake air temperature correction map according to the related art is a one-dimensional map using only the intake air temperature THa as a parameter, and the number of maps is one regardless of the presence or absence of EGR gas. Thus, in the knocking control according to the related art, the EGR rate is not taken into account in calculating the intake air temperature correction retardation amount α. As long as the intake air temperature THa remains equal to the same value, the intake air temperature correction retardation amount α is also set to the same value regardless of the EGR rate.

In fact, however, as shown in FIG. 6, it has been newly revealed that the knocking sensitivity for the intake air temperature fluctuates in accordance with the presence or absence of EGR gas and the EGR rate. For example, in FIG. 6, the gradient of the graph with the EGR rate=20% is greatly different from the gradient of the graph with the EGR rate=5%. This tendency is remarkable especially in a range in which the EGR rate is higher than 10%.

Figure 7:
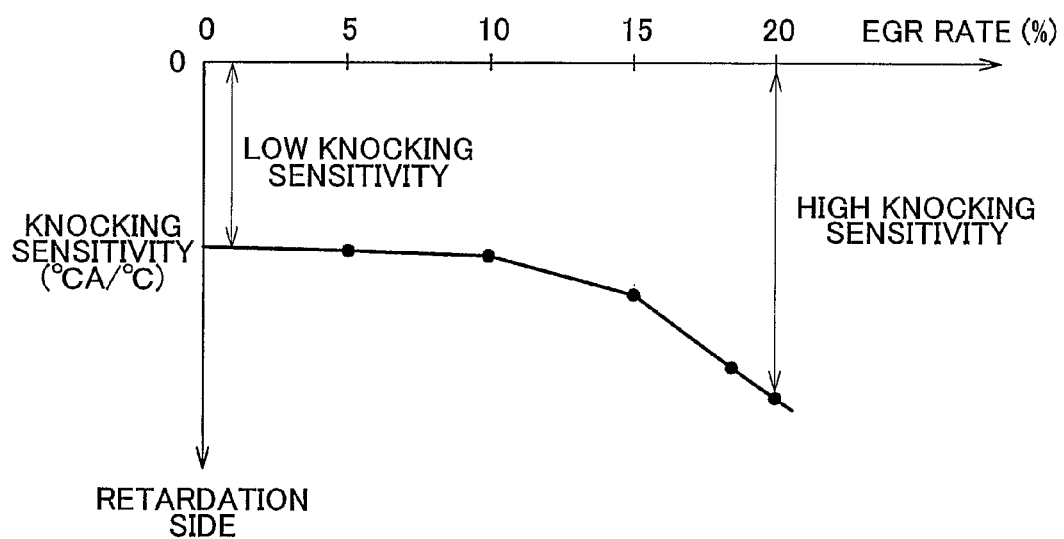
FIG. 7 is a view showing a corresponding relationship between an EGR rate and a knocking sensitivity for an intake air temperature.

FIG. 7 shows a corresponding relationship between an EGR rate and a knocking sensitivity for an intake air temperature in the case where the intake air temperature THa is constant. As shown in FIG. 7, the knocking sensitivity for the intake air temperature increases as the EGR rate increases. The knocking sensitivity for the intake air temperature abruptly increases especially in a mass EGR range in which the EGR rate is higher than 10%.

Thus, the ECU 400 according to this embodiment of the invention stores therein in advance a map for the time when EGR is off and a map for the time when EGR is on as intake air temperature correction maps used to calculate the intake air temperature correction retardation amount α. The ECU 400 selects one of the maps depending on whether EGR control is on or off, and calculates the intake air temperature correction retardation amount α. This is the most characteristic point of the invention.

Figure 8:
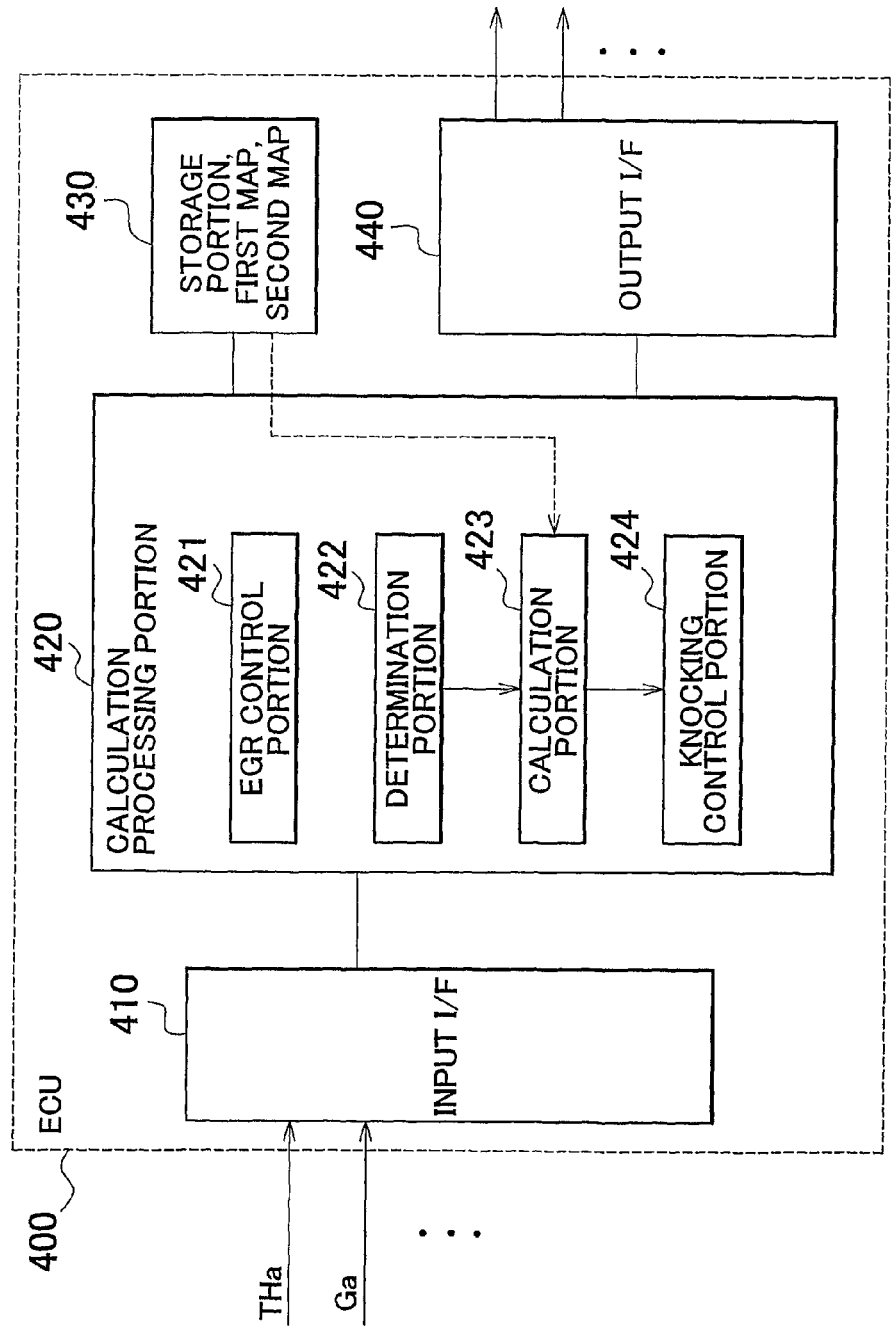
FIG. 8 is a functional block diagram of the ECU.

FIG. 8 is a functional block diagram of the ECU 400 in performing EGR control and knocking control. The ECU 400 includes an input interface 410, a calculation processing portion 420, a storage portion 430, and an output interface 440.

The input interface 410 receives detection results from the respective sensors, namely, the intake air temperature THa from the intake air temperature sensor 118, the intake air amount Ga from the airflow meter 116, and the like, and transmits the detection results to the calculation processing portion 420.

Various pieces of information, programs, thresholds, maps, and the like are stored in the storage portion 430. Data are read out from the calculation processing portion 420 or stored thereinto according to need. The base ignition timing map, the intake air temperature correction map, the coolant temperature correction map, the oil temperature correction map, the learning value of the predetermined amount B, and the like as described above are stored in this storage portion 430.

In this embodiment of the invention, a first map that is used when EGR is on and a second map that is used when EGR is off are stored in the storage portion 430 as intake air temperature correction maps.

FIG. 9 shows the first map that is used when EGR is on. FIG. 10 shows the second map that is used when EGR is off.

As shown in FIG. 9, the first map is a two-dimensional map that determines the intake air temperature correction retardation amount αon at the time when EGR is on using the intake air temperature THa and the engine load KL as parameters. It should be noted herein that the engine load KL as well as the intake air temperature THa is added as a parameter used for the first map because there is a correlation shown in FIG. 5 between the engine load KL and the EGR rate (the EGR valve opening degree θ). By thus adding the engine load KL as a parameter, the intake air temperature correction retardation amount αon at the time when EGR is on can be set to an appropriate value taking into account a change in the knocking sensitivity for the intake air temperature resulting from a change in the EGR rate.

In consideration of the fact that the knocking sensitivity for the intake air temperature (i.e., the convergent ignition timing changes toward the retardation side) as the EGR rate increases as shown in FIGS. 6 and 7, the first map is created such that the intake air temperature correction retardation amount αon increases as the engine load KL assumes a value corresponding to a higher EGR rate under the condition that the intake air temperature THa remain unchanged.

Further, in consideration of the fact that the speed of combustion increases and the convergent ignition timing changes toward the retardation side as the intake air temperature THa rises, the first map is created such that the intake air temperature correction retardation amount αon increases as the intake air temperature THa rises under the condition that the engine load KL remain unchanged.

As shown in FIG. 10, the second map is a two-dimensional map that determines the intake air temperature correction retardation amount αoff at the time when EGR is off, using the intake air temperature THa and the engine load KL as parameters. The engine load KL as well as the intake air temperature THa is added as a parameter used for the second map mainly for the purpose of making the number of dimensions equal to that of the first map. By thus adding the engine load KL as a parameter even when EGR is off, the intake air temperature correction retardation amount αoff at the time when EGR is off can be set more finely. In the second map, the intake air temperature correction retardation amount αoff is so set as to increase as the intake air temperature THa rises.

Furthermore, in consideration of the fact that the knocking sensitivity for the intake air temperature at the time when EGR is on is higher than the knocking sensitivity for the intake air temperature at the time when EGR is off (i.e., the convergent ignition timing at the time when EGR is on changes further toward the retardation side than the convergent ignition timing at the time when EGR is off), the first map and the second map are matched with each other such that the intake air temperature correction retardation amount αon at the time when EGR is on becomes larger than the intake air temperature correction retardation amount αoff at the time when EGR is off under the condition that the parameters be the same.

Returning to FIG. 8, the calculation processing portion 420 includes an EGR control portion 421, a determination portion 422, a calculation portion 423, and a knocking control portion 424.

The EGR control portion 421 performs the aforementioned EGR control (the all-range EGR control and the mass EGR control). That is, when the aforementioned EGR activating condition is fulfilled (when the vehicle speed>the threshold speed and the coolant temperature THw<the threshold temperature), the EGR control portion 421 controls the EGR valve 502 such that the aforementioned corresponding relationship shown in FIG. 5 is established between the engine load KL and the EGR valve opening degree θ (the EGR rate).

The determination portion 422 determines whether or not the aforementioned EGR control is being performed (whether or not EGR is on). This determination is made depending on whether or not the EGR activating condition is fulfilled.

When EGR is on, the calculation portion 423 selects the aforementioned first map for the time when EGR is on as shown in FIG. 9 from the intake air temperature correction maps stored in the storage portion 420. On the other hand, when EGR is off, the calculation portion 423 selects the aforementioned second map for the time when EGR is off as shown in FIG. 10 from the intake air temperature correction maps stored in the storage portion 430.

Using the selected intake air temperature correction map, the calculation portion 423 then calculates the intake air temperature correction retardation amount αon or the intake air temperature correction retardation amount αoff as a value corresponding to the current intake air temperature THa and the current engine load KL.

The knocking control portion 424 performs the aforementioned knocking control on the basis of the intake air temperature correction retardation amount αon calculated by the calculation portion 423 or the intake air temperature correction retardation amount αff calculated by the calculation portion 423. That is, the knocking control portion 424 sets the intake air temperature correction retardation amount αon calculated by the calculation portion 423 or the intake air temperature correction retardation amount αoff calculated by the calculation portion 423 as the intake air temperature correction retardation amount α. Thus, the intake air temperature correction retardation amount α is set lager when EGR is on than when EGR is off. Further, when EGR is on, the intake air temperature correction retardation amount α is set to a value that increases as the EGR rate increases and as the intake air temperature THa rises.

When the coolant temperature correction retardation amount β and the oil temperature correction retardation amount γ are set to 0, the knocking control portion 424 sets the target ignition timing d as the base ignition timing—the intake air temperature correction retardation amount α—the predetermined amount A+the predetermined amount B. The knocking control portion 424 then repeatedly increases and reduces the predetermined amount B (learns the predetermined amount B) in accordance with the situation of occurrence of knocking to gradually converge the target ignition timing d (i.e., the actual ignition timing) to the convergent ignition timing.

The aforementioned functions of the ECU 400 may be realized through either software or hardware.

Figure 11:
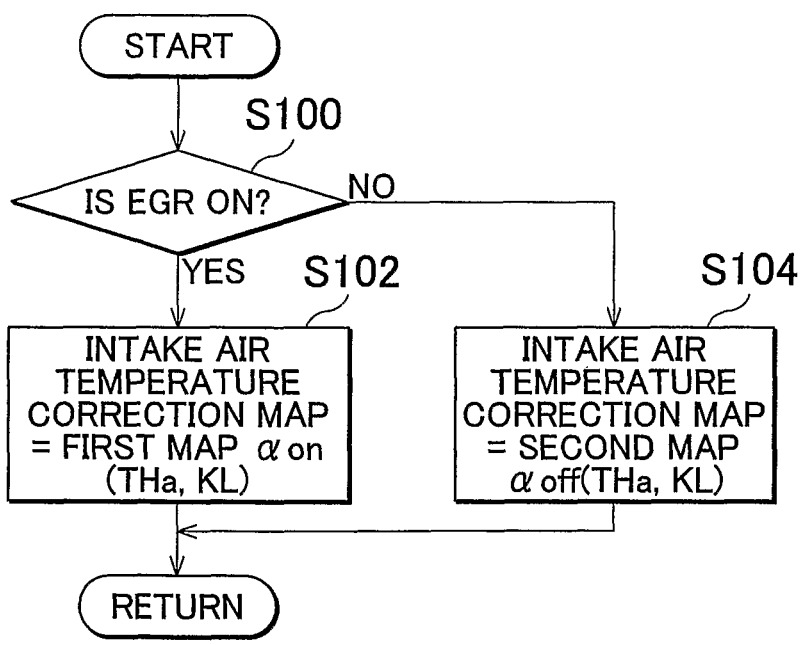
FIG. 11 is a view showing the flow of a processing of the ECU according to the first embodiment of the invention.

FIG. 11 is the flow of a processing of the ECU 400 in realizing the aforementioned functions of the determination portion 422 of the ECU 400 and the calculation portion 423 of the ECU 400 through software. It should be noted that this processing is repeatedly performed at intervals of a predetermined cycle time.

As shown in FIG. 11, in step (hereinafter abbreviated as S) 100, the ECU 400 determines whether or not EGR control is being performed (whether or not EGR is on). This determination is made depending on whether or not the aforementioned EGR activating condition is fulfilled (whether or not the condition that the vehicle speed>the threshold speed and the coolant temperature THw<the threshold temperature is fulfilled). When an affirmative determination is made in this processing step (YES in S100), the processing is shifted to S102. Otherwise (NO in S100), the processing is shifted to S104.

In S102, the ECU 400 selects the aforementioned first map for the time when EGR is on as shown in FIG. 9, as the intake air temperature correction map. Thus, the intake air temperature correction retardation amount α is set as the intake air temperature correction retardation amount αon (THa, KL) for the time when EGR is on, which corresponds to the intake air temperature THa and the engine load KL. Therefore, the target ignition timing d is equal to the base ignition timing—αon (THa, KL)–A–B.

In S104, the ECU 400 selects the aforementioned second map for the time when EGR is off as shown in FIG. 10, as the intake air temperature correction map. Thus, the intake air temperature correction retardation amount α is set to the intake air temperature correction retardation amount αoff (THa, KL) for the time when EGR is off, which corresponds to the intake air temperature THa and the engine load KL. Therefore, the target ignition timing d is equal to the base ignition timing—αoff (THa, KL)–A–B.

The ignition timing control of the ECU 400 based on the structure and flowchart as described above will be described with reference to FIGS. 12 and 13.

Figure 12:
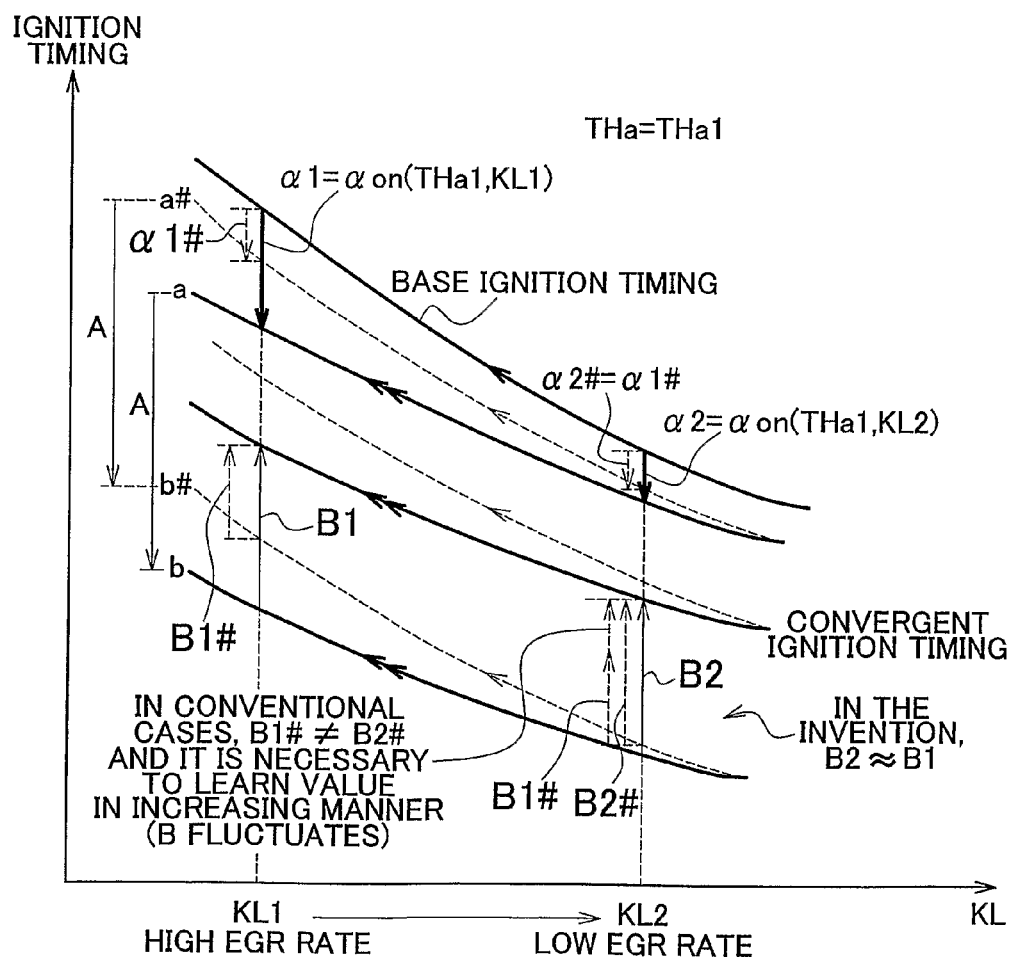
FIG. 12 is a view showing how the ignition timing changes when the engine load increases.
Figure 13:
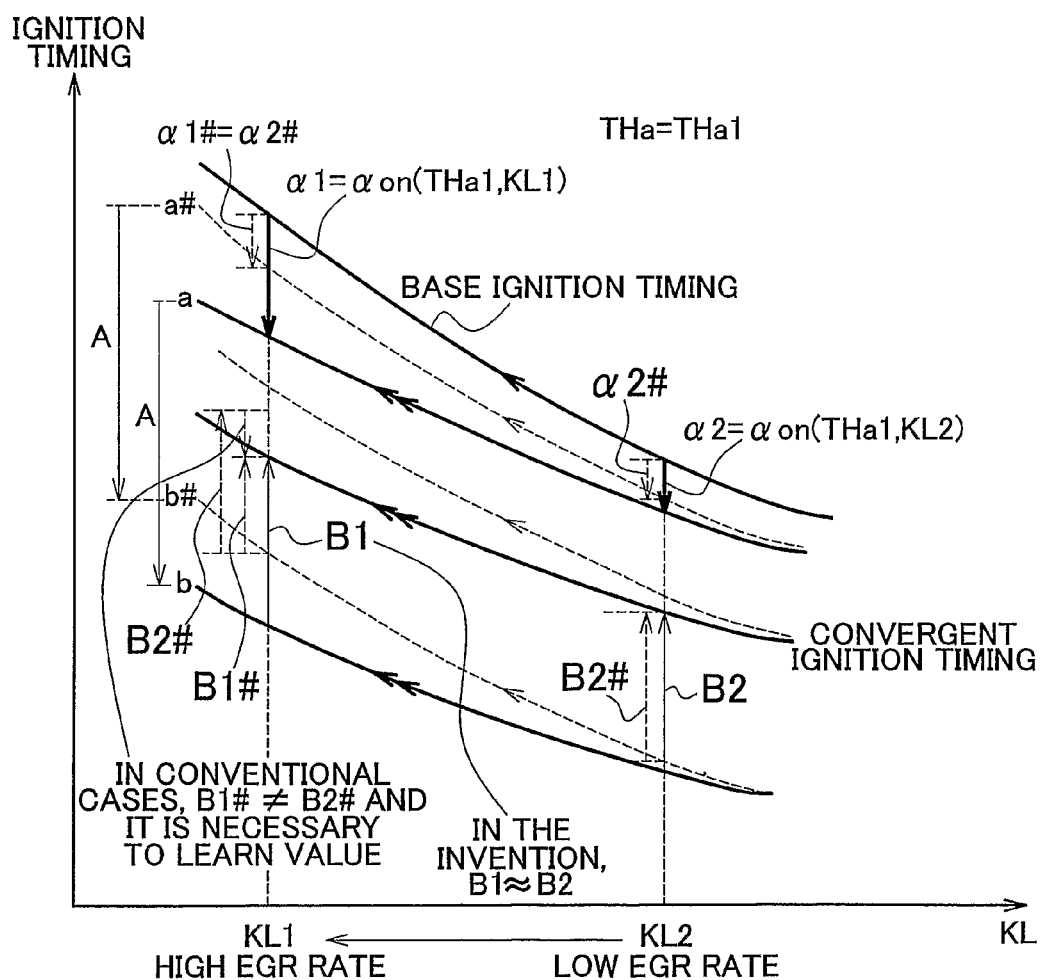
FIG. 13 is a view showing how the ignition timing changes when the engine load decreases.

FIGS. 12 and 13 show how the ignition timing changes as the engine load KL changes when the intake air temperature THa assumes a constant value of THa1 and EGR is on. FIG. 12 shows how the ignition timing changes when the engine load KL increases from a low load KL1 to a high load KL2. On the other hand, FIG. 13 shows how the ignition timing changes when the engine load KL decreases from KL2 to KL1.

It should be noted that the ignition timings according to the invention and the ignition timings according to the related art are indicated by solid lines and alternate long and short dash lines respectively in FIGS. 12 and 13. Further, the set ignition timing a, the most retarded timing b, an intake air temperature correction retardation amount α1 at the time when KL=KL1, a learned predetermined amount B1 at the time when KL=KL1, an intake air temperature correction retardation amount α2 at the time when KL=KL2, and a learned predetermined amount B2 at the time when KL=KL2 represent the values according to the invention. On the other hand, a set ignition timing a#, a most retarded timing b#, an intake air temperature correction retardation amount α1# at the time when KL=KL1, a learned predetermined amount B1# at the time when KL=KL1, an intake air temperature correction retardation amount α2# at the time when KL=KL2, and a learned predetermined amount B2# at the time when KL=KL2 represent the values according to the related art.

In the related art, the EGR rate (the engine load KL) is not taken into account in calculating the intake air temperature correction retardation amount α#. Therefore, when the intake air temperature THa is constant, the intake air temperature correction retardation amount α# is set to the same value (α1#=α2#) even in the case of a change in the EGR rate (the engine load KL). Thus, the graphs of the base ignition timing, the set ignition timing a#, and the most retarded timing b# are parallel to one another.

In fact, however, the knocking sensitivity for the intake air temperature increases as the EGR rate increases (as the engine load KL decreases). Therefore, the difference between the convergent ignition timing and the set ignition timing a# increases as the engine load KL decreases. Thus, the graphs of the most retarded timing b# and the convergent ignition timing are not parallel to each other, and the difference between the most retarded timing b# and the convergent ignition timing decreases as the engine load KL decreases. Due to this influence, the learned predetermined amount B1# at the time when KL=KL1 is smaller than the learned predetermined amount B2# at the time when KL=KL2. It should be noted that this tendency becomes more remarkable as the intake air temperature THa rises.

As a result, in the case where the engine load KL increases from KL1 to KL2, when the learned predetermined amount B1# at the time KL=KL1 is applied at the time when KL=KL2, the actual ignition timing is retarded with respect to the convergent ignition timing as shown in FIG. 12. Thus, the predetermined amount B# needs to be learned in an increasing manner from B1# to B2#. A reduction in torque and a deterioration in fuel consumption continue until this learning is completed.

Further, in the case where the engine load KL decreases from KL2 to KL1, when the learned predetermined amount B2# at the time when KL=KL2 is applied at the time when KL=KL1, the actual ignition timing is advanced with respect to the convergent ignition timing as shown in FIG. 13, and knocking occurs. Thus, the predetermined amount B# needs to be learned in a decreasing manner from B2# to B1#. Knocking continuously occurs and causes a sense of incongruity to a user of the vehicle until this learning is completed.

On the other hand, in this embodiment of the invention, the intake air temperature correction retardation amount α is calculated using the first map (see FIG. 9) that uses as a parameter the engine load KL, which is correlated to the EGR rate, as well as the intake air temperature THa, in consideration of a change in the knocking sensitivity for the intake air temperature resulting from a change in the EGR rate.

Thus, as shown in FIGS. 12 and 13, the intake air temperature correction retardation amount α1 (=αon (THa1, KL1)) at the time when KL=KL1 is calculated as a value lager than the intake air temperature correction retardation amount α2 (=αon (THa1, KL2)) at the time when KL=KL2, and the graphs of the set ignition timing a and the most retarded timing b are set substantially parallel to the graph of the convergent ignition timing.

Thus, the learned predetermined amount B1 at the time when KL=KL1 and the learned predetermined amount B2 at the time when KL=KL2 can be held substantially constant. Accordingly, even in a transient period of the engine load KL, the actual ignition timing can be converged to the convergent ignition timing at an early stage. Thus, a reduction in torque, a deterioration in fuel consumption, and the occurrence of knocking during a transition in which the engine load KL changes can be appropriately suppressed.

As described above, the ECU according to this embodiment of the invention stores therein in advance the map for the time when EGR is off and the map for the time when EGR is on as the intake air temperature correction maps used to calculate the intake air temperature correction retardation amount α, and selects one of the maps in accordance with the on/off state of EGR control to calculate the intake air temperature correction retardation amount α. Thus, the intake air temperature correction retardation amount α can be set as a necessary and sufficient amount under a condition taking into account the presence or absence of EGR gas and the amount of EGR gas. Thus, in comparison with the case where the single intake air temperature correction map is used, a reduction in torque, a deterioration in fuel consumption, and the occurrence of knocking can be more appropriately suppressed even when the engine load KL changes under the condition that the intake air temperature THa be high.

A first modification example of the first embodiment of the invention will be described hereinafter. In the foregoing first embodiment of the invention, the first map and the second map as the intake air temperature correction maps are two-dimensional maps using the intake air temperature THa and the engine load KL as parameters. On the other hand, it is also appropriate to adapt the first map and the second map to the time when EGR is on and the time when EGR is off respectively using only the intake air temperature THa as a parameter.

Figure 14:
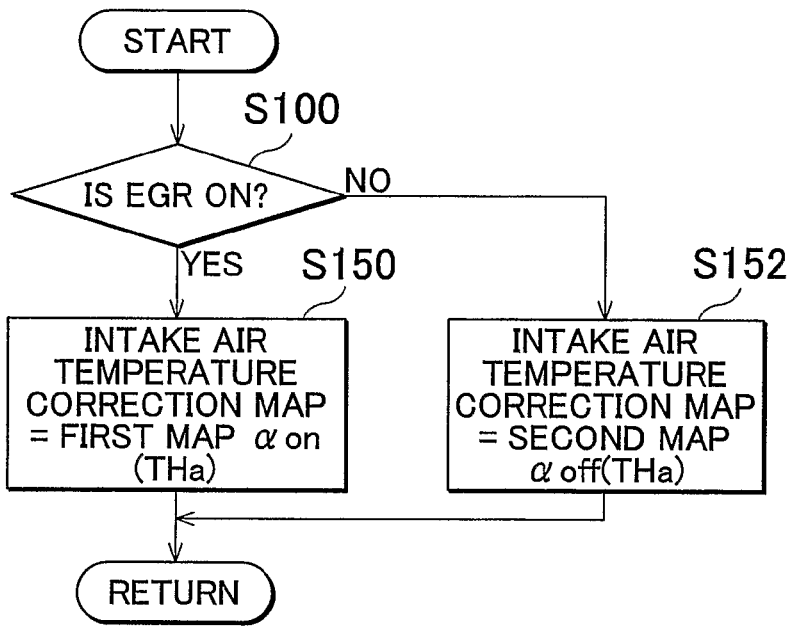
FIG. 14 is a view showing the flow of a processing of an ECU according to a first modification example of the first embodiment of the invention.

That is, as shown in FIG. 14, the ECU 400 selects a first map as a one-dimensional map using only the intake air temperature THa as a parameter (S150) when EGR is on (YES in S100), and selects a second map as a one-dimensional map using only the intake air temperature THa as a parameter (S152) when EGR is off (NO in S100).

In this manner; even by simply selecting the first map or the second map in accordance with the on/off state of EGR, the intake air temperature correction retardation amount α can be set in consideration of a change in the knocking sensitivity for the intake air temperature resulting from a change in the on/off state of EGR.

It should be noted that the first map may remain the two-dimensional map using the intake air temperature THa and the engine load KL as parameters, and that the second map may be designed as a one-dimensional map using only the intake air temperature THa as a parameter in consideration of the fact that the EGR rate does not change when EGR is off.

A second modification example of the first embodiment of the invention will be described hereinafter. In the foregoing first embodiment of the invention, the intake air temperature correction maps are designed as two-dimensional maps using the intake air temperature THa and the engine load KL as parameters, in consideration of the fact that the knocking sensitivity for the intake air temperature changes as the EGR rate changes.

However, the knocking sensitivity for the intake air temperature changes not only when the EGR rate changes but also when the VVT advancement amount is changed. Accordingly, the knocking sensitivity for the intake air temperature changes in a more complicated manner under a condition composed of changes in the EGR rate and changes in the VVT advancement amount.

Thus, the first map may be designed as a three-dimensional map using as a parameter the engine rotational speed Ne as well as the intake air temperature THa and the engine load KL. It should be noted that the engine rotational speed Ne is adopted as a parameter used in the first map in addition to the intake air temperature THa and the engine load KL because the VVT advancement amount is substantially uniquely determined by the engine load KL and the engine rotational speed Ne. It should be noted that the knocking sensitivity for the intake air temperature tends to increase as the engine load KL decreases (as the EGR rate increases) and as the engine rotational speed Ne decreases (as the VVT advancement amount or the intake air amount Ga decreases). It is therefore appropriate to set the first map in consideration of this tendency.

Figure 15:
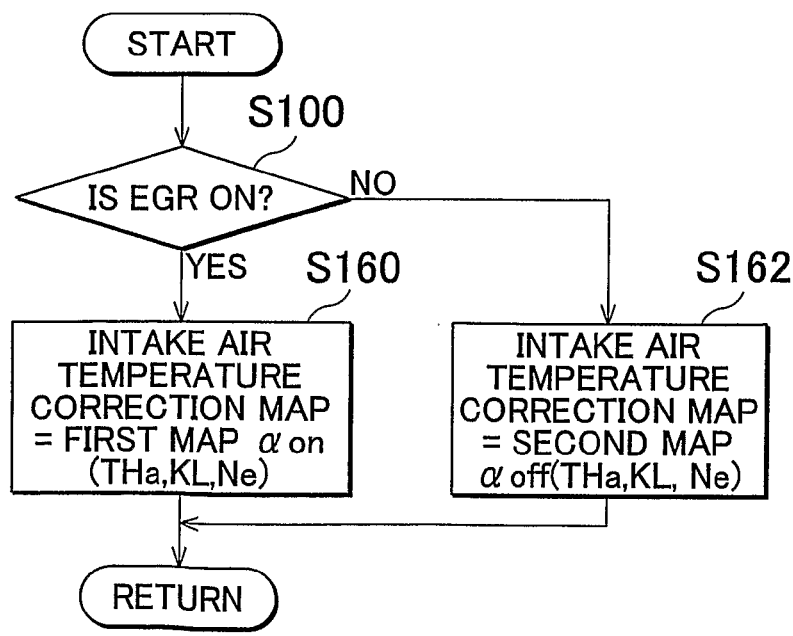
FIG. 15 is a view showing the flow of a processing of an ECU according to a second modification example of the first embodiment of the invention.

Then, as shown in FIG. 15, the ECU 400 selects the first map designed as a three-dimensional map using the intake air temperature THa, the engine load KL, and the engine rotational speed Ne as parameters (S160) when EGR is on (YES in S100), and selects the second map designed as a three-dimensional map using the intake air temperature THa, the engine load KL, and the engine rotational speed Ne as parameters (S162) when EGR is off (NO in S100). It should be noted that the second map may be designed as a one-dimensional map using only the intake air temperature THa as a parameter.

In this manner, the intake air temperature correction retardation amount α can be set as a necessary and sufficient amount under various conditions taking into account the VVT advancement amount as well as the presence or absence of EGR gas and the amount of EGR gas, by using as a parameter the engine rotational speed Ne as well as the intake air temperature THa and the engine load KL.

It should be noted that the combustion characteristics of the engine change in accordance with the engine rotational speed even when the opening timing of the intake valve is constant, and that the combustion characteristics more drastically change due to changes in the flow of exhaust gas especially when EGR is on. Thus, the use of the engine rotational speed Ne as a parameter of the intake air temperature correction map is also effective in an engine having no VVT mechanism 126.

The second embodiment of the invention will be described hereinafter.

In the foregoing first embodiment of the invention, the case where the map for the time when EGR is off and the map for the time when EGR is on are stored in advance as the intake air temperature correction maps and one of the maps is selected in accordance with the on/off state of EGR control has been described.

However, a change in the EGR rate has an influence not only on the knocking sensitivity for the intake air temperature but also on the amount of change in the convergent ignition timing at the time when the coolant temperature changes by a unit temperature (hereinafter referred to also as "the knocking sensitivity for the coolant temperature").

Thus, in this embodiment of the invention, two maps for the time when EGR is off and the time when EGR is on are provided not only as the intake air temperature correction maps but also as coolant temperature correction maps used to calculate the coolant temperature correction retardation amount β. That is, the first map for the time when EGR is on and the second map for the time when EGR is off are stored in advance as the coolant temperature correction maps, and one of the maps is selected in accordance with the on/off state of EGR control. The second embodiment of the invention is identical in other structural, functional, and processing details to the foregoing first embodiment of the invention and hence will not be described hereinafter in detail.

The ECU 400 stores therein in advance the first map for the time when EGR is on and the second map for the time when EGR is off as the coolant temperature correction maps. In this case, the first map for the time when EGR is on is designed as a three-dimensional map using as a parameter the engine load KL, which is correlated to the EGR rate, as well as the coolant temperature THw and the engine rotational speed Ne, in consideration of changes in the knocking sensitivity for the coolant temperature resulting from changes in the EGR rate. Further, as is the case with the first map, the second map for the time when EGR is off is also designed as a three-dimensional map using the coolant temperature THw, the engine rotational speed Ne, and the engine load KL as parameters.

Figure 16:
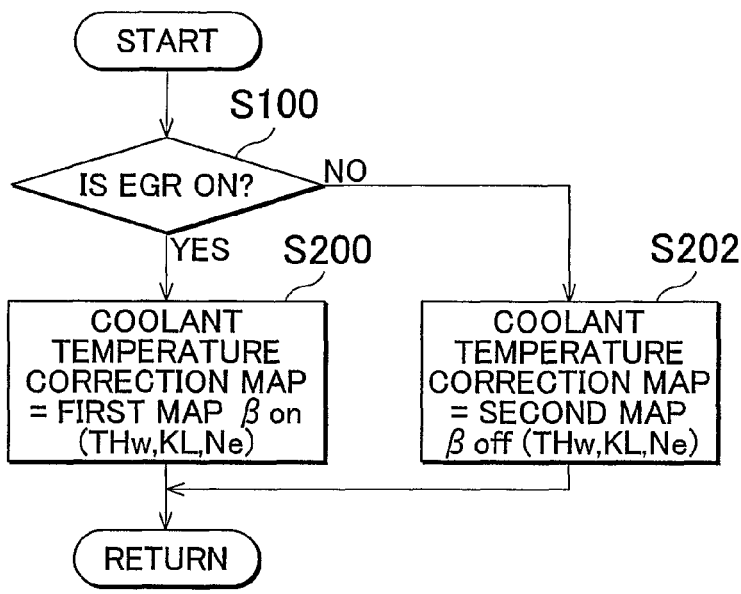
FIG. 16 is a view showing the flow of a processing of an ECU according to the second embodiment of the invention.

Then, as shown in FIG. 16, the ECU 400 selects the first map for the time when EGR is on as the coolant temperature correction map (S200) when EGR is on (YES in S100), and selects the second map for the time when EGR is off as the coolant temperature correction map (S202) when EGR is off (NO in S100).

In this manner, the coolant temperature correction retardation amount β can be set as a necessary and sufficient amount under various conditions taking into account the presence or absence of EGR gas and the amount of EGR gas, by providing the first map for the time when EGR is off and the second map for the time when EGR is on as the coolant temperature correction maps and adding as a parameter of the first map for the time when EGR is off the engine load KL, which is correlated to the EGR rate, as well as the coolant temperature THw and the engine rotational speed Ne.

A modification example of the foregoing second embodiment of the invention will be described hereinafter. As is the case with the coolant temperature correction maps described in the foregoing second embodiment of the invention, a first map for the time when EGR is on and a second map for the time when EGR is off may be provided as oil temperature correction maps, and the first map for the time when EGR is on may be designed as a three-dimensional map using the coolant temperature THw, the engine rotational speed Ne, and the engine load KL as parameters, in consideration of changes in the knocking sensitivity for the oil temperature resulting from changes in the EGR rate.

Figure 17:
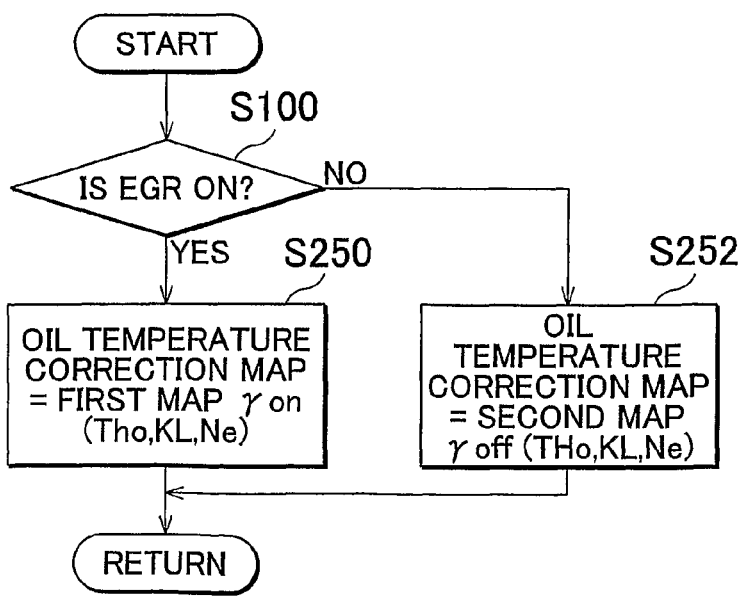
FIG. 17 is a view showing the flow of a processing of an ECU according to a modification example of the second embodiment of the invention.

Then, as shown in FIG. 17, the ECU 400 selects the first map for the time when EGR is on as the oil temperature correction map (S250) when EGR is on (YES in S100), and selects the second map for the time when EGR is off as the oil temperature correction map (S252) when EGR is off (NO in S100).

Thus, the oil temperature correction retardation amount γ can be set as a necessary and sufficient amount under various conditions taking into account the presence or absence of EGR gas and the amount of EGR gas.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention claimed is:

1. A control apparatus for an internal combustion engine equipped with a recirculation device for returning part of exhaust gas to an intake side, comprising:
a calculation portion that calculates a retardation amount indicating an amount by which a base ignition timing determined by an operation state of the internal combustion engine is corrected toward a retardation side, in accordance with at least an intake air temperature as a temperature of a gas sucked into the internal combustion engine from among (i) the intake air temperature, (ii) a coolant temperature as a temperature of a coolant for cooling the internal combustion engine, and (iii) an oil temperature as a temperature of an oil in the internal combustion engine; and
a control portion that controls an ignition timing of the internal combustion engine with reference to a set ignition timing obtained by retarding the base ignition timing in accordance with the retardation amount, wherein
the calculation portion calculates the retardation amount as a larger value when the recirculation device is in operation than when the recirculation device is stopped, and
the retardation amount includes an intake air temperature retardation amount indicating an amount by which the base ignition timing is corrected toward the retardation side in accordance with the intake air temperature as the temperature of the gas sucked into the internal combustion engine.

2. The control apparatus according to claim 1, wherein the intake air temperature retardation amount during operation of the recirculation device, which is calculated by the calculation portion, assumes a value that increases as an amount of exhaust gas returned to the intake side by the recirculation device increases.

3. The control apparatus according to claim 1, further comprising a storage portion that stores therein in advance a first map that determines the intake air temperature retardation amount during operation of the recirculation device using the intake air temperature of the internal combustion engine as a parameter, and a second map that determines the intake air temperature retardation amount during stoppage of the recirculation device using the intake air temperature of the internal combustion engine as a parameter, wherein
the calculation portion calculates the intake air temperature retardation amount as a value corresponding to an actual intake air temperature of the internal combustion engine using the first map when the recirculation device is in operation, and calculates the intake air temperature retardation amount as a value corresponding to an actual intake air temperature of the internal combustion engine using the second map when the recirculation device is stopped.

4. The control apparatus according to claim 3, wherein the first map is a map that determines the intake air temperature retardation amount using as a parameter a load of the internal combustion engine as well as the intake air temperature of the internal combustion engine, and
the calculation portion calculates the intake air temperature retardation amount as a value corresponding to an actual intake air temperature of the internal combustion engine and an actual load of the internal combustion engine using the first map when the recirculation device is in operation.

5. The control apparatus according to claim 4, wherein the recirculation device returns to the intake side exhaust gas in an exhaust gas recirculation amount that is adjusted in accordance with a load of the internal combustion engine, and
the first map is set such that a second intake air temperature retardation amount corresponding to a second load at which the exhaust gas recirculation amount is equal to a second amount larger than a first amount becomes larger than a first intake air temperature retardation amount corresponding to a first load at which the exhaust gas recirculation amount is equal to the first amount.

6. The control apparatus according to claim 4, wherein the first map is a map that determines the intake air temperature retardation amount using as a parameter a rotational speed of the internal combustion engine as well as the intake air temperature of the internal combustion engine and the load of the internal combustion engine, and
the calculation portion calculates the intake air temperature retardation amount as a value corresponding to an actual intake air temperature of the internal combustion engine, an actual load of the internal combustion engine, and an actual rotational speed of the internal combustion engine using the first map when the recirculation device is in operation.

7. The control apparatus according to claim 1, wherein the retardation amount is a coolant temperature retardation amount indicating an amount by which the base ignition timing is corrected toward the retardation side in accordance with the coolant temperature as the temperature of the coolant for cooling the internal combustion engine.

8. The control apparatus according to claim 7, further comprising a storage portion that stores therein in advance a first map that determines the coolant temperature retardation amount during operation of the recirculation device using the coolant temperature of the internal combustion engine, a load of the internal combustion engine, and a rotational speed of the internal combustion engine as parameters, and a second map that determines the coolant temperature retardation amount during stoppage of the recirculation device using the coolant temperature of the internal combustion engine, the load of the internal combustion engine, and the rotational speed of the internal combustion engine as parameters, wherein
the calculation portion calculates the coolant temperature retardation amount as a value corresponding to an actual coolant temperature of the internal combustion engine, an actual load of the internal combustion engine, and an actual rotational speed of the internal combustion engine using the first map when the recirculation device is in operation, and calculates the coolant temperature retardation amount as a value corresponding to an actual coolant temperature of the internal combustion engine, an actual load of the internal combustion engine, and an actual rotational speed of the internal combustion engine using the second map when the recirculation device is stopped.

9. The control apparatus according to claim 1, wherein the retardation amount is an oil temperature retardation amount indicating an amount by which the base ignition timing is corrected toward the retardation side in accordance with the oil temperature as the temperature of the oil in the internal combustion engine.

10. The control apparatus according to claim 9, further comprising a storage portion that stores therein in advance a first map that determines the oil temperature retardation amount during operation of the recirculation device using the oil temperature of the internal combustion engine, a load of the internal combustion engine, and a rotational speed of the internal combustion engine as parameters, and a second map that determines the oil temperature retardation amount during stoppage of the recirculation device using the oil temperature of the internal combustion engine, the load of the internal combustion engine, and the rotational speed of the internal combustion engine as parameters, wherein the calculation portion calculates the oil temperature retardation amount as a value corresponding to an actual oil temperature of the internal combustion engine, an actual load of the internal combustion engine, and an actual rotational speed of the internal combustion engine using the first map when the recirculation device is in operation, and calculates the oil temperature retardation amount as a value corresponding to an actual oil temperature of the internal combustion engine, an actual load of the internal combustion engine, and an actual rotational speed of the internal combustion engine using the second map when the recirculation device is stopped.

11. The control apparatus according to claim 1, wherein the control portion repeatedly performs control for setting a target ignition timing obtained through correction of the set ignition timing in accordance with a predetermined amount to set an actual ignition timing of the internal combustion engine as the target ignition timing, and control for correcting the predetermined amount in accordance with a situation of occurrence of knocking in the internal combustion engine.

12. A control method for an internal combustion engine equipped with a recirculation device for returning part of exhaust gas to an intake side, comprising:

calculating a retardation amount indicating an amount by which a base ignition timing determined by an operation state of the internal combustion engine is corrected toward a retardation side, in accordance with at least an intake air temperature as a temperature of a gas sucked into the internal combustion engine from among the intake air temperature, a coolant temperature as a temperature of a coolant for cooling the internal combustion engine, and an oil temperature as a temperature of an oil in the internal combustion engine; and controlling an ignition timing of the internal combustion engine with reference to a set ignition timing obtained by retarding the base ignition timing in accordance with the retardation amount, wherein the retardation amount is calculated as a larger value when the recirculation device is in operation than when the recirculation device is stopped, and the retardation amount includes an intake air temperature retardation amount indicating an amount by which the base ignition timing is corrected toward the retardation side in accordance with the intake air temperature as the temperature of the gas sucked into the internal combustion engine.

* * * * *